US012278954B2

(12) United States Patent
Iida et al.

(10) Patent No.: US 12,278,954 B2
(45) Date of Patent: Apr. 15, 2025

(54) VIDEO CODING DEVICE AND VIDEO CODING METHOD

(71) Applicant: NEC Corporation, Tokyo (JP)

(72) Inventors: Kenta Iida, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 18/273,150

(22) PCT Filed: Dec. 6, 2021

(86) PCT No.: PCT/JP2021/044716
§ 371 (c)(1),
(2) Date: Jul. 19, 2023

(87) PCT Pub. No.: WO2022/158147
PCT Pub. Date: Jul. 28, 2022

(65) Prior Publication Data
US 2024/0107009 A1    Mar. 28, 2024

(30) Foreign Application Priority Data
Jan. 25, 2021    (JP) ................. 2021-009539

(51) Int. Cl.
*H04N 19/11*    (2014.01)
*H04N 19/124*    (2014.01)
(Continued)

(52) U.S. Cl.
CPC ........... *H04N 19/11* (2014.11); *H04N 19/124* (2014.11); *H04N 19/18* (2014.11); *H04N 19/593* (2014.11); *H04N 19/597* (2014.11)

(58) Field of Classification Search
CPC ...... H04N 19/11; H04N 19/124; H04N 19/18; H04N 19/593; H04N 19/597;
(Continued)

(56) References Cited

U.S. PATENT DOCUMENTS

| | | | |
|---|---|---|---|
| 2003/0108099 A1* | 6/2003 | Nagumo .................. | G06T 9/20 375/E7.199 |
| 2015/0264403 A1* | 9/2015 | Chong ................. | H04N 19/176 375/240.18 |

(Continued)

FOREIGN PATENT DOCUMENTS

| | | |
|---|---|---|
| JP | 2017-513342 A | 5/2017 |
| WO | 2015/183375 A2 | 12/2015 |

OTHER PUBLICATIONS

International Search Report for PCT Application No. PCT/JP2021/044716, mailed on Feb. 22, 2022.
(Continued)

*Primary Examiner* — Joseph Suh
(74) *Attorney, Agent, or Firm* — Sughrue Mion, PLLC

(57) ABSTRACT

The video coding device calculates a first value representing energy of the prediction error signals of the block to be processed, eliminates specified transform coefficients when at least one of a width and a height of the block to be processed exceeds a predetermined value and calculates a second value representing energy of the transform coefficients other than the eliminated transform coefficients, and decides not to make the candidate of prediction mode the optimal prediction mode, without executing quantizing, arithmetic-coding and local decoding, in a case where the second value is smaller than a predetermined degree as compared to the first value.

10 Claims, 6 Drawing Sheets

(51) Int. Cl.
*H04N 19/18* (2014.01)
*H04N 19/593* (2014.01)
*H04N 19/597* (2014.01)

(58) Field of Classification Search
CPC .. H04N 19/103; H04N 19/136; H04N 19/157; H04N 19/176
See application file for complete search history.

(56) References Cited

U.S. PATENT DOCUMENTS

2016/0373739 A1* 12/2016 Holcomb ............ H04N 19/176
2019/0387241 A1 12/2019 Kim et al.

OTHER PUBLICATIONS

Benjamin Bross, et al., "Versatile Video Coding (Draft 10)", JVET-S2001-v7, Joint Video Experts Team (JVET) of ITU-T SG16 WP3 and ISO/IEC JTC1/SC29/WG11 19th Meeting: by teleconference, Jun. 22-Jul. 1, 2020.
Jianle Chen et al., "Algorithm description for Versatile Video Coding and Test Model 10" (VTM 10), Joint Video Experts Team (JVET) of ITU-T SG 16 WP 3 and ISO/IEC JTC 1/SC29/WG 11, JVET-S2002-v1, Oct. 11, 2020. 10 p. 56 cols. 3.5.1.
Benjamin Bross et al., "Overview of the Versatile Video Coding (VVC) Standard and Its Applications", IEEE Transactions of Circuits and Systems for Video Technolgy, Oct. 2021, vol. 31. No. 10, pp. 3747-3748.
JP Official Communication for Japanese Patent Application No. 2022-577019, mailed on Mar. 12, 2024 with English Translation.

* cited by examiner

VIDEO CODING DEVICE AND VIDEO CODING METHOD

This application is a National Stage Entry of PCT/JP2021/044716 filed on Dec. 6, 2021, which claims priority from Japanese Patent Application 2021-009539 filed on Jan. 25, 2021, the contents of all of which are incorporated herein by reference, in their entirety.

TECHNICAL FIELD

This invention relates to a video coding device and a video coding method for encoding moving images.

BACKGROUND ART

Non-patent literature 1 discloses a video coding method called VVC (Versatile Video Coding). VVC is also called ITU-T H.266.

In VVC, the maximum size of the coding tree unit (CTU: Coding Tree Unit) is extended from 64×64 pixels (hereinafter simply expressed as 64×64) in H.265/HEVC (High Efficiency Video Coding) to 128×128. Hereinafter, unless otherwise noted, "size" means [height×width] pixels.

The coding process in VVC is performed in a unit of the coding unit (CU: Coding Unit) defined from the CTU. The CU is a block generated by partitioning the CTU using the quad-tree (QT: Quad-Tree) structure or the multi-type tree (MMT: Multi-Type Tree) structure, or the CTU itself. In partitioning using the quad-tree structure, a CTU is partitioned equally in the horizontal and vertical directions. In partitioning using the multi-type tree structure, a CTU is partitioned into two or three blocks in the horizontal or vertical direction.

CUs are predictive-coded. Predictive coding includes intra-prediction and inter-prediction with motion compensation (hereinafter simply referred to as inter-prediction). The prediction error of each CU is transformed into a transform coefficient by frequency-transforming.

In general, the size of the prediction unit (PU: Prediction Unit) and the transform unit (TU: Transform Unit) is the same as the size of the CU. In VVC, the maximum size of the TU is extended to 64×64.

For frequency-transforming, discrete cosine transform (DCT: Discrete Cosine Transform) is mainly used. In general, since the energy of the transform coefficient obtained by frequency-transforming is concentrated in the low frequency area, the values of the transform coefficients in the low frequency area are larger and those in the high frequency area are smaller.

FIGS. 7A-7C are explanatory diagrams for explaining the DCT which is an example of frequency-transforming. In the example shown in FIGS. 7A-7C, the size of TU is 64×64 (refer to FIG. 7A). As illustrated in FIG. 7B, a distribution of frequency components (two-dimensional matrix) after DCT is applied. In the example shown in FIG. 7B, the values of the transform coefficients are large in the upper left area (low frequency area). In the lower right area (high frequency area), the values of the transform coefficients are small. In other words, most of the frequency components are concentrated in the low frequency area. In FIG. 7B, the low frequency area and the high frequency area are not shown exactly, but are outlined by ellipses.

CITATION LIST

Non-Patent Literature

NPL1: Benjamin Bross, et al., "Versatile Video Coding (Draft 10)", JVET-S2001-v7, Joint Video Experts Team (JVET) of ITU-T SG16 WP3 and ISO/IEC JTC1/SC29/WG11 19th Meeting: by teleconference, 22 Jun.-1 Jul. 2020

SUMMARY OF INVENTION

Technical Problem

In VVC, to reduce an amount of computation, when at least one of the TU width (horizontal size M) and height (vertical size N) exceeds 32, as illustrated in FIG. 7C, the area where it exceeds 32, i.e., transform coefficients of high frequency components, is eliminated. Therefore, both M and N of the block consisting of multiple transform coefficients are less than 32. The elimination of transform coefficients is equivalent to setting the values of the transform coefficients to 0. FIG. 7C illustrates an example where 32×32 transform coefficients are generated from a TU whose size is 64×64. The eliminated transform coefficients are those in the high frequency area as described above. The values of transform coefficients in the high frequency area are generally small, in other words, the energy concentration is low. Therefore, even if the transform coefficients in the high frequency area are eliminated, the quality of image decoded in the video decoding device is not affected (not degraded).

A video coding device selects the optimal prediction mode from a number of prediction modes and performs predictive coding on a block-by-block basis. In selecting the optimal prediction mode, the video coding device performs frequency-transforming, quantization, inverse quantization, inverse-frequency-transforming, and arithmetic coding processes, for example, on the prediction error signal generated based on candidate prediction modes that can be used.

As mentioned above, when at least one of the width and the height of the TU exceeds 32, the transform coefficients in the area where it exceeds 32 are eliminated. In general, even if the transform coefficients in the high frequency area are eliminated, the image quality will not be degraded much. However, when the values of the transform coefficients in the high frequency area are relatively large, the quality of the image decoded by the video decoding device will be degraded.

When the concentration of energy is relatively large in the high frequency area in a two-dimensional matrix (a matrix of N rows and M columns) of transform coefficients, the prediction mode that includes the original TUs to become the base of such a two-dimensional matrix is likely not to be selected as the optimal prediction mode.

However, when evaluating multiple prediction modes sequentially, a general video coding device performs processing to select the optimal prediction mode, including prediction modes that are likely not to be selected as the optimal prediction mode as candidates. In other words, the video coding device performs an inverse quantization process, an inverse frequency transform process, an arithmetic coding process, etc., even for prediction modes that have a high possibility of not being selected as the optimal prediction mode.

As a result, the process for selecting the optimal prediction mode by a general video coding device is likely to include useless processing. The processing load of the video coding device increases when the video coding device performs useless processing. In addition, the time (processing time) required for the video coding device to complete the coding process based on the optimal prediction mode becomes longer.

Therefore, it is an object of the present invention to provide a video coding device and a video coding method that can reduce processing time by reducing possibility that the video coding device performs useless processing when selecting the optimal prediction mode.

Solution to Problem

The video coding device according to the present invention includes transform means for transforming prediction error signals of a block to be processed to generate transform coefficients, quantization means for quantizing the transform coefficient to generate a quantized transform coefficient, arithmetic coding means for arithmetic-coding the quantized transform coefficient, local decoding means for local-decoding the quantized transform coefficients, prediction mode selection means for evaluating a plurality of candidates of prediction mode to select an optimal prediction mode for the block to be processed, original energy calculation means for calculating a first value representing energy of the prediction error signals of the block to be processed, and modified energy calculation means for eliminating specified transform coefficients when at least one of a width and a height of the block to be processed exceeds a predetermined value and calculating a second value representing energy of the transform coefficients other than the eliminated transform coefficients, wherein the prediction mode selection means decides not to make the candidate of prediction mode the optimal prediction mode, without the quantization means, the arithmetic coding means and the local decoding means executing quantizing, arithmetic-coding and local decoding, in a case where the second value is smaller than a predetermined degree as compared to the first value.

The video coding method according to the present invention includes transforming prediction error signals of a block to be processed to generate transform coefficients, calculating a first value representing energy of the prediction error signals of the block to be processed, eliminating specified transform coefficients when at least one of a width and a height of the block to be processed exceeds a predetermined value and calculating a second value representing energy of the transform coefficients other than the eliminated transform coefficients, quantizing the transform coefficient to generate a quantized transform coefficient, arithmetic-coding the quantized transform coefficient, local-decoding the quantized transform coefficients, and evaluating a plurality of candidates of prediction mode to select an optimal prediction mode for the block to be processed, wherein the candidate of prediction mode is not to made the optimal prediction mode, without executing quantizing, arithmetic-coding and local decoding, in a case where the second value is smaller than a predetermined degree as compared to the first value.

The video coding program according to the present invention causes a computer to execute a process of transforming prediction error signals of a block to be processed to generate transform coefficients, a process of calculating a first value representing energy of the prediction error signals of the block to be processed, a process of eliminating specified transform coefficients when at least one of a width and a height of the block to be processed exceeds a predetermined value and calculating a second value representing energy of the transform coefficients other than the eliminated transform coefficients, a process of quantizing the transform coefficient to generate a quantized transform coefficient, a process of arithmetic-coding the quantized transform coefficient, local-decoding the quantized transform coefficients, and a process of evaluating a plurality of candidates of prediction mode to select an optimal prediction mode for the block to be processed, wherein the candidate of prediction mode is not to made the optimal prediction mode, without executing quantizing, arithmetic-coding and local decoding, in a case where the second value is smaller than a predetermined degree as compared to the first value.

Advantageous Effects of Invention

According to the present invention, the processing load of the video coding device is reduced and the processing time is shortened.

DESCRIPTION OF EMBODIMENTS

Hereinafter, example embodiments of the video coding device will be explained with reference to the drawings.

Example Embodiment 1

Figure 1:
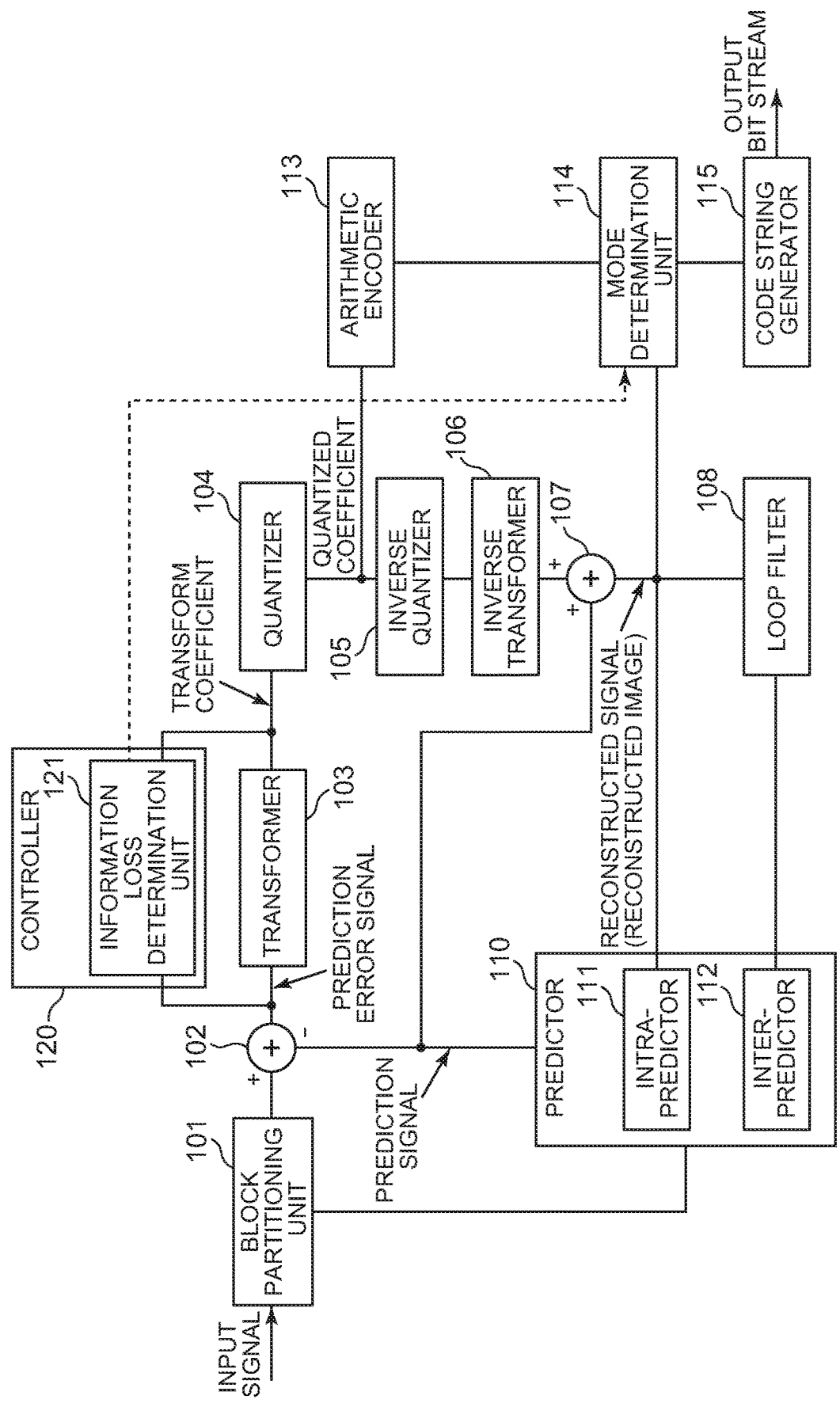
FIG. 1 It depicts a block diagram showing a configuration example of a video coding device.

FIG. 1 is a block diagram showing a configuration example of a video coding device. The video coding device shown in FIG. 1 includes a block partitioning unit 101, a subtractor 102, a transformer 103, a quantizer 104, an inverse quantizer 105, an inverse transformer 106, an adder 107, a loop filter 108, a predictor 110, an arithmetic encoder 113, a mode determination unit 114, and a code string generator 115. The predictor 110 includes an intra-predictor 111 and an inter-predictor 112.

The video coding device further includes a controller 120 having an information loss determination unit 121.

The block partitioning unit 101 partitions a picture into multiple CTUs. Further, the block partitioning unit 101 defines a CTU as a CU as it is without partitioning, or defines individual blocks obtained by partitioning a CTS using the quadtree or multi-type tree structure, or using the quadtree and multi-type tree structures, as CUs. In subsequent processing, CUs are treated as blocks to be processed. The block partitioning unit 101 defines a CU as a PU as it is without partitioning, or defines blocks obtained by partitioning a CU, as PUs. Similarly, the block partitioning unit 101 defines a CU as a TU as it is without partitioning, or defines blocks obtained by partitioning a CU, as TUs.

The subtractor 102 subtracts a prediction signal from an input signal (input pixel value) for each block generated by the block partitioning unit 101 to generate a prediction error signal. The prediction error signal is also called a prediction residual or a prediction residual signal. The transformer 103 frequency-transforms the prediction error signal of the block to be processed to obtain a transform coefficient. The transformer 103 has multiple types of orthogonal transform functions including type II DCT (DCT-II), and selects an appropriate orthogonal transform function according to the size of the block to be processed, etc., and performs frequency-transforming by the selected orthogonal transform function.

The quantizer 104 quantizes the transform coefficient into quantized coefficient (transform quantization value). The transform quantized value is used in the arithmetic encoder 113 and the inverse quantizer 105.

The inverse quantizer 105 inverse-quantizes the transform quantization value to restore the transform coefficient. The inverse transformer 106 inverse-frequency-transforms the transform coefficient based on the orthogonal transform method selected by the transformer 103 to restore the prediction error signa. The adder 107 adds the restored prediction error signal and the prediction signal to generate a reconstructed signal (reconstructed image). The intra-predictor 111, the loop filter 108, and the mode determination unit 114 input the reconstructed signal.

In general, a block memory is provided at the front of the predictor 110 or in the intra-predictor 111 for storing a reference block in the picture to be encoded, but is omitted in FIG. 1. The intra-predictor 111 performs intra-prediction for the block to be coded by referring to a reference block to generate a prediction signal (in this case, intra-prediction signal).

The loop filter 108 includes a deblocking filter, a sample adaptive offset filter, and an adaptive loop filter, for example, to provide appropriate filtering. The reconstructed signal filtered by the loop filter 108 is input to the inter-predictor 112. A frame memory for storing a reference picture is generally provided at the front of the predictor 110 or in the inter-predictor 112, but is omitted in FIG. 1.

The inter-predictor 112 performs inter-prediction for the block to be encoded by referring to a reference picture different from the picture to be encoded to generate a prediction signal (in this case, inter-prediction signal).

The arithmetic encoder 113 generates a coded signal (code string: bit stream) by arithmetic-coding the transform quantization value. The arithmetic encoder 113 binarizes the transform quantization value and generates a binary arithmetic code by arithmetic-coding the binary signal.

The mode determination unit 114 selects the optimal prediction mode. The code string generator 115 selects a binary arithmetic code under the optimal prediction mode and outputs it as a bitstream. For example, the bitstream is transmitted to an image decoding device. The bitstream may be output to a storage medium (not shown) for storage in the storage medium. The information loss determination unit 121 evaluates the degree of information loss when the prediction error signal is frequency-transformed in each prediction mode, when multiple candidate prediction modes are evaluated in sequence for the block to be processed. Evaluating the degree of information loss corresponds to evaluating the degree of energy bias to the low frequency area.

Hereinafter, the inverse quantizer 105, the inverse transformer 106, and the adder 107 are sometimes referred to as a local decoding unit.

As mentioned above, in VVC, when at least one of the width and the height of the TU exceeds 32, the transform coefficients for the area where it exceeds 32 (i.e., the high frequency area) are eliminated. The area where at least one of the width and the height of the TU exceeds 32 corresponds to the high frequency area. When the degree of energy concentration in the low frequency components is large after frequency-transforming, the quality of the image decoded in a video decoding device (image quality after decoding) is not degraded much even if the transform coefficients in the high frequency area are excluded.

However, when the degree of energy concentration in the low frequency components is not so large, the image quality after decoding is degraded when the transform coefficients in the high frequency area are eliminated. In other words, the amount of information in the original image is reduced when the transform coefficients in the high frequency area are eliminated during frequency-transforming. That is, information is lost.

In this example embodiment, the information loss determination unit 121 takes advantage of the fact that the energy of the signals is preserved (does not change) before and after the orthogonal transforming (for example, DCT) as frequency-transforming performed by the transformer 103. The information loss determination unit 121 calculates a value representing the energy of the prediction error signals and a value representing the energy of the transform coefficients. The information loss determination unit 121 then compares the two. The information loss determination unit 121 calculates the transform coefficient in the area from which the high frequency area (the area where the width and the height of the TU exceed 32) is eliminated, i.e., the area where the width and the height of the TU are 32 or less, that is, the value representing the energy of the low frequency component.

When the degree of energy concentration in the low frequency component is small (when the amount of information loss is large), i.e., when the image quality after decoding is degraded, the difference between the value representing the energy of the transform coefficient and the value representing the energy of the prediction error signals is large. A prediction mode that presents such a situation is unlikely to be selected as the optimal prediction mode.

Accordingly, when the information loss determination unit 121 determines that the value of the energy of the transform coefficients is smaller than a predetermined degree relative to the value of the energy of the prediction error signals while candidates of prediction mode are being evaluated, the information loss determination unit 121 controls to terminate the evaluation of the prediction mode.

Specifically, the information loss determination unit 121 calculates a sum of squares T of the prediction error signals included in TU ($\Sigma_{i=0}^{P-1} d_i^2$: $d_i$=prediction error signal, P=the number of prediction error signals) as the value representing the energy of the prediction error signals. Similarly, the information loss determination unit 121 calculates a sum of squares S of the transform coefficients ($\Sigma_{j=0}^{Q-1} g_j^2$: $g_j$=transform coefficients, Q=the number of transform coefficients) as the value representing the energy of the transform coefficients.

The information loss determination unit 121 controls to terminate the evaluation of the prediction mode when the value of S/T is less than or equal to a predetermined threshold (set th) or less, the control is performed to terminate the evaluation of the prediction mode. In this example embodiment, the threshold value th is predetermined. For example, when a shorter processing time is required, a larger value is used as the threshold th. Formulas other than S/T may be used as the formula for determining information loss. As an example, $\sqrt{S}/\sqrt{T}$ may be used as the formula.

As an example, the video coding device includes a storage unit (not shown) that stores a table in which data that can identify each of the candidates for multiple types of prediction modes is set. When evaluating candidates of prediction mode, the controller 120 sets the prediction mode to be evaluated to the predictor 110.

The following modes are possible prediction modes to be set in the table, with respect to intra-prediction.
  DC prediction
  Planar prediction
  Angular prediction
With respect to inter-prediction, the following modes are possible.
  Adaptive motion vector coding
  Merge coding
With respect to intra-prediction, the following prediction modes (refer to non-patent literature 1) may be added as candidates of prediction mode.
  IBC (Intra Block Copy)
  MIP (Matrix-based Intra Prediction)
With respect to inter-prediction, the following prediction modes (refer to non-patent literature 1) may be added as candidates of prediction mode.
  Affine prediction
  GPM (Geometric Partitioning Mode)
  CIIP (Combined inter merge/intra prediction)

The use of a table in which data that can identify each of candidates of prediction mode in the video coding device is just one example. For example, when the video coding device is realized by a processor, data that can identify each of candidates of prediction mode may be described in a program.

Figure 2:
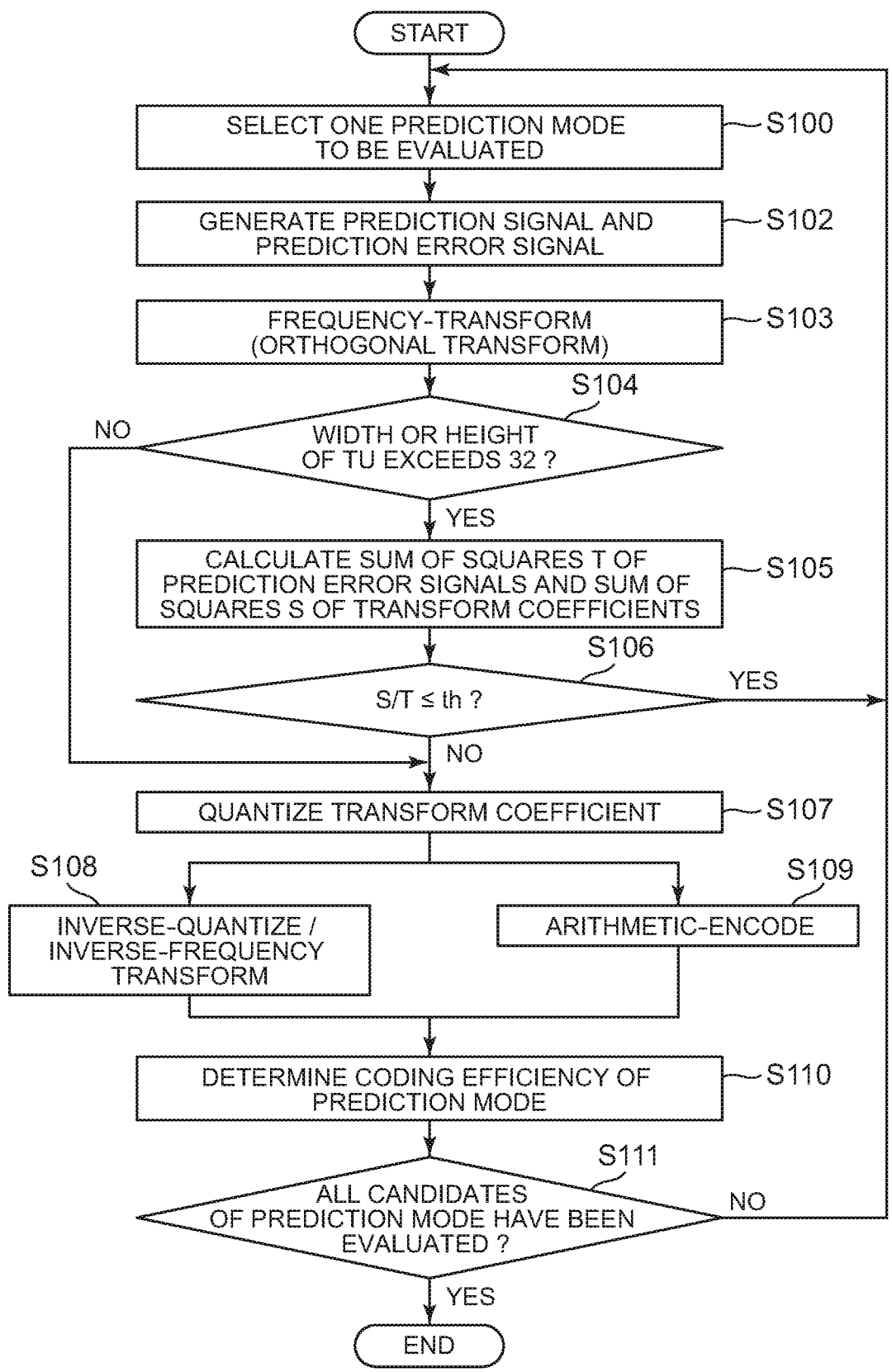
FIG. 2 It depicts a flowchart showing an operation regarding evaluation of candidates of prediction mode in the first example embodiment of the video coding device.

Next, an operation related to the evaluation of candidates of prediction mode in the video coding device are described with reference to the flowchart in FIG. 2. It is assumed that a table in which data that can identify each of candidates of prediction mode is used in the video coding device.

The controller 120 selects one prediction mode from a plurality of prediction modes (candidates of prediction mode) to be evaluated (step S100).

In the predictor 110, the intra-predictor 111 or the inter-predictor 112 generates a prediction signal for the block input from the block partitioning unit 101 (step S102). In addition, the subtractor 102 generates a prediction error signal (step S102). The transformer 103 frequency-transforms the prediction error signal to generate a transform coefficient (step S103). It is noted that when at least one of the width and the height of the TU exceeds 32, the transformer 103 eliminates the transform coefficients for the area where it exceeds 32 (i.e., the high frequency area). In other words, assuming a two-dimensional matrix with transform coefficients as elements, both rows and columns are less than or equal to 32 in the transform result of the transformer 103.

When at least one of the horizontal and vertical sizes of the TU exceeds 32, the transformer 103 may eliminate the transform coefficients in the high frequency area as the transform result, or the transformer 103 may set the transform coefficients in the whole area as the transform result, and the quantizer 104 may quantize the transform coefficients in the area where both row and column are less than or equal to 32, and discard the other transform coefficients.

When the original TU size (both the width (horizontal size M) and the height (vertical size N) of the TU as determined by the block partitioning unit 101) is 32 or less, the process moves to step S107 (step S104).

When either or both of the width and the height of the original TU exceed 32, the information loss determination unit 121 calculates a sum of squares T of the prediction error signals and a sum of squares S of the transform coefficients (in a two-dimensional matrix with transform coefficients as elements, both rows and columns are 32 or less) (step S105). The loss determination unit 121 compares the value of S/T with the threshold value th (step S106).

When the value of S/T is less than or equal to the threshold value th, then the process moves to step S100. In this case, in step S100, the controller 120 selects the next prediction mode from the table. Therefore, the candidate of prediction mode under evaluation is decided not to be the optimal prediction mode at this stage. When the value of S/T is larger than the threshold value th, then move to step S107. As mentioned above, other decision formulas other than S/T may be used as the decision formula for information loss. For example, when $\sqrt{S}/\sqrt{T}$ is used as the determination formula, the controller 120 compares the value of $\sqrt{S}/\sqrt{T}$ with the threshold value th in step S106.

In step S107, the quantizer 104 quantizes the transform coefficient from the transformer 103 to generate a transform quantization value. The inverse quantizer 105 and the arithmetic encoder 113 input the transform quantization value.

The inverse quantizer 105 inverse-quantizes the transform quantization value, and the inverse transformer 106 inverse-frequency-transforms the transform quantization value which was inverse-quantized to restore the transform coefficient (step S108). The arithmetic encoder 113 arithmetic-encodes the transform quantization value to generate a coded signal (step S109).

The mode determination unit 114 determines the coding efficiency as an evaluation result. Coding efficiency means how much coding can be performed with a small amount of code and with little deterioration of image quality. For example, the mode determination unit 114 judges coding efficiency that minimizes the coding cost J as an index expressed by the following formula (1).

$$J = D + \lambda R \qquad (1)$$

In equation (1), D represents coding distortion, for example, a sum of squares of a difference between the original image (input signal) and the reconstructed image (reconstructed signal). R is an amount of code generated by the arithmetic encoder 113, for example. λ is a Lagrange multiplier determined based on quantization parameters, etc.

The mode determination unit 114 may use an index other than formula (1) as an index for determining coding efficiency. As an example, the mode determination unit 114 may use only one of R and D. When only R is used, the arithmetic coding process (the process of step S109) is unnecessary. The mode determination unit 114 may, for example, use a cumulative sum (sum total) of the prediction error signals instead of the sum of squares of the difference between the original image (input signal) and the reconstructed image (reconstructed signal). The mode determination unit 114 may use an input code amount to the arithmetic encoder 113 or a code amount estimated by some other method, instead of the code amount generated by the arithmetic encoder 113.

When the evaluation (process of steps S101-S110) is completed for all candidates of prediction mode set in the table, the process is terminated (step S111). If there are un-evaluated prediction modes, the process returns to step 100.

For example, the mode determination unit 114 temporarily stores the coding efficiency of each candidate of prediction mode in the process of step S110. The prediction mode that presents the lowest coding efficiency among the stored coding efficiencies is determined as the prediction mode to be used in the actual coding process. Instead of storing the coding efficiencies of all candidates of prediction mode, the mode determination unit 114 may store the smallest coding efficiency and the prediction mode that presented the smallest coding efficiency. In that case, in the process of step S110, when the coding efficiency calculated at that time is smaller than the stored coding efficiency, the stored coding efficiency and prediction mode will be updated with the calculated coding efficiency and the prediction mode that presented the coding efficiency.

The mode determination unit 114 selects the candidate of prediction mode that presents the highest coding efficiency as the optimal prediction mode, for example. The video coding device performs the actual coding process (the process for generating the output bit stream) using the optimal prediction mode.

In this example embodiment, the video coding device performs control for eliminating transform coefficients in the area where at least one of the horizontal size (width) and the vertical size (height) of the TU exceeds a predetermined size, in case at least one of the horizontal size (width) and the vertical size (height) of the TU exceeds the predetermined size. Since when determining the optimal prediction mode, the video coding device does not perform local decoding by the local decoding unit in case the video coding device determines that the information loss in the frequency-transforming by the transformer 103 is large, the processing load when determining the optimal prediction mode is reduced. As a result, the processing time is reduced. In addition, since when the value of S/T is less than or equal to the threshold value th (when it is determined that the information loss in the frequency-transforming by the transformer 103 is large) by the processing of step S106, the processing moves to step S100, quantization and arithmetic-coding by the quantizer 104 and the arithmetic encoder 113 are also not performed. This also reduces the processing load and processing time when determining the optimal prediction mode.

In the local decoding unit, when at least one of the width and the height of the TU exceeds a predetermined value, the inverse transformer 106 performs inverse-frequency-transforming after setting 0 as the transform coefficient in the area where one of the width and the height of the TU exceeds the predetermined value to the transform coefficient restored by the inverse quantizer 105.

Example Embodiment 2

Figure 3:
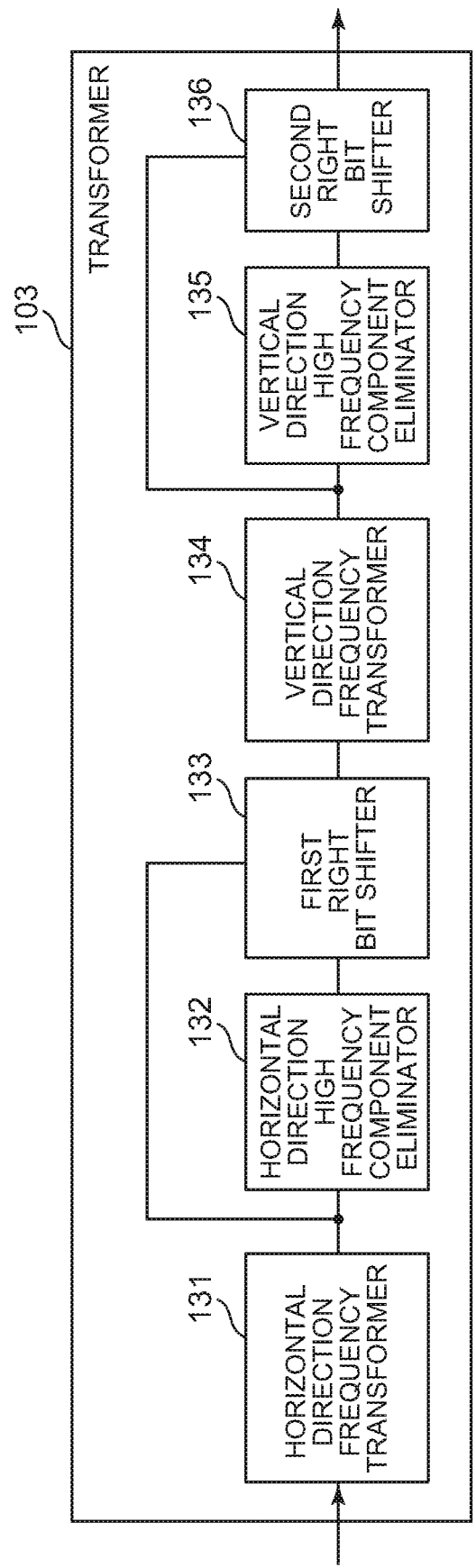
FIG. 3 It depicts a block diagram showing a configuration example of a transformer.

FIG. 3 is a block diagram showing a configuration example of the transformer 103. The transformer 103 shown in FIG. 3 includes a horizontal direction frequency transformer 131, a horizontal direction high frequency component eliminator 132, a first right bit shifter 133, a vertical direction frequency transformer 134, a vertical direction high frequency component eliminator 135, and a second right bit shifter 136.

The transformer 103 executes integer precision DCT. Assume M is the width (horizontal size) and N is the height (vertical size) of the TU. The horizontal direction frequency transformer 131 frequency-transforms a prediction error signal in the horizontal direction using a predetermined basis to generate a transform coefficient. In other words, the horizontal direction frequency transformer 131 performs one-dimensional DCT in the horizontal direction.

When M>32, the horizontal direction high frequency component eliminator 132 eliminates transform coefficients in the area where the size exceeds 32. When M≤32, the process of the horizontal direction high frequency component eliminator 132 is skipped. The first right bit shifter 133 bit-shifts the transform coefficient to the right by $\log_2 N-1$ bits.

Next, the vertical direction frequency transformer 134 frequency-transforms the prediction error signal in the vertical direction using a predetermined basis to generate a transform coefficient. In other words, the vertical direction frequency transformer 134 performs one-dimensional DCT in the vertical direction.

When N>32, the vertical direction high frequency component eliminator 135 eliminates transform coefficients in the area where the size exceeds 32. When N≤32, the process of the vertical direction high frequency component eliminator 135 is skipped. The second right bit shifter 136 bit-shifts the transform coefficient to the right by $\log_2 N+6$ bits.

As described above, the transformer 103 performs DCT (two-dimensional DCT) by performing one-dimensional DCT in the horizontal direction and one-dimensional DCT in the vertical direction in sequence. The transformer 103 may perform one-dimensional DCT in the vertical direction first. It should be noted that in the first example embodiment (Example embodiment 1), the transformer 103 also performs the above process.

In the first example embodiment, the information loss determination unit 121 calculates the sum of squares S of the transform coefficients that are the output of the transformer 103. Specifically, the information loss determination unit 121 calculates the sum of squares S of the transform coefficients output by the second right bit shifter 136. In the second example embodiment (Example embodiment 2), the information loss determination unit 121 calculates the sum of squares S of the transform coefficients of the one-dimensional DCT in the horizontal direction output from the first right bit shifter 133. When the transformer 103 is configured to perform the one-dimensional DCT in the vertical direction first, the information loss determination unit 121 calculates the sum of squares S of the transform coefficients of the one-dimensional DCT in the vertical direction.

Other processes are the same as those in the first example embodiment. That is, in the second example embodiment, the operation related to the evaluation of candidates of prediction mode in the video coding device are also performed as shown in FIG. 2, however in the second example embodiment, in the process of step S105, the information loss determination unit 121 calculates the sum of squares S of the transform coefficients of the one-dimensional DCT. It should be noted that the configuration of the video coding device is basically the same as that illustrated in FIG. 1.

For example, in case the transformer 103 is configured as shown in FIG. 3, when the size of the horizontal TU exceeds 32, one-dimensional DCT in the horizontal direction is performed and high frequency components are eliminated. If the degree of information loss is already large at that stage, the prediction mode to be evaluated is not selected as the optimal prediction mode. In other words, there is no significance for one-dimensional DCT in the vertical direction to be performed in addition to the one-dimensional DCT in the horizontal direction. In the second example embodiment, since the processing for evaluating prediction modes is terminated at an earlier stage, the processing load when determining the optimal prediction mode is smaller. As a result, processing time is further reduced.

Example Embodiment 3

Figure 4:
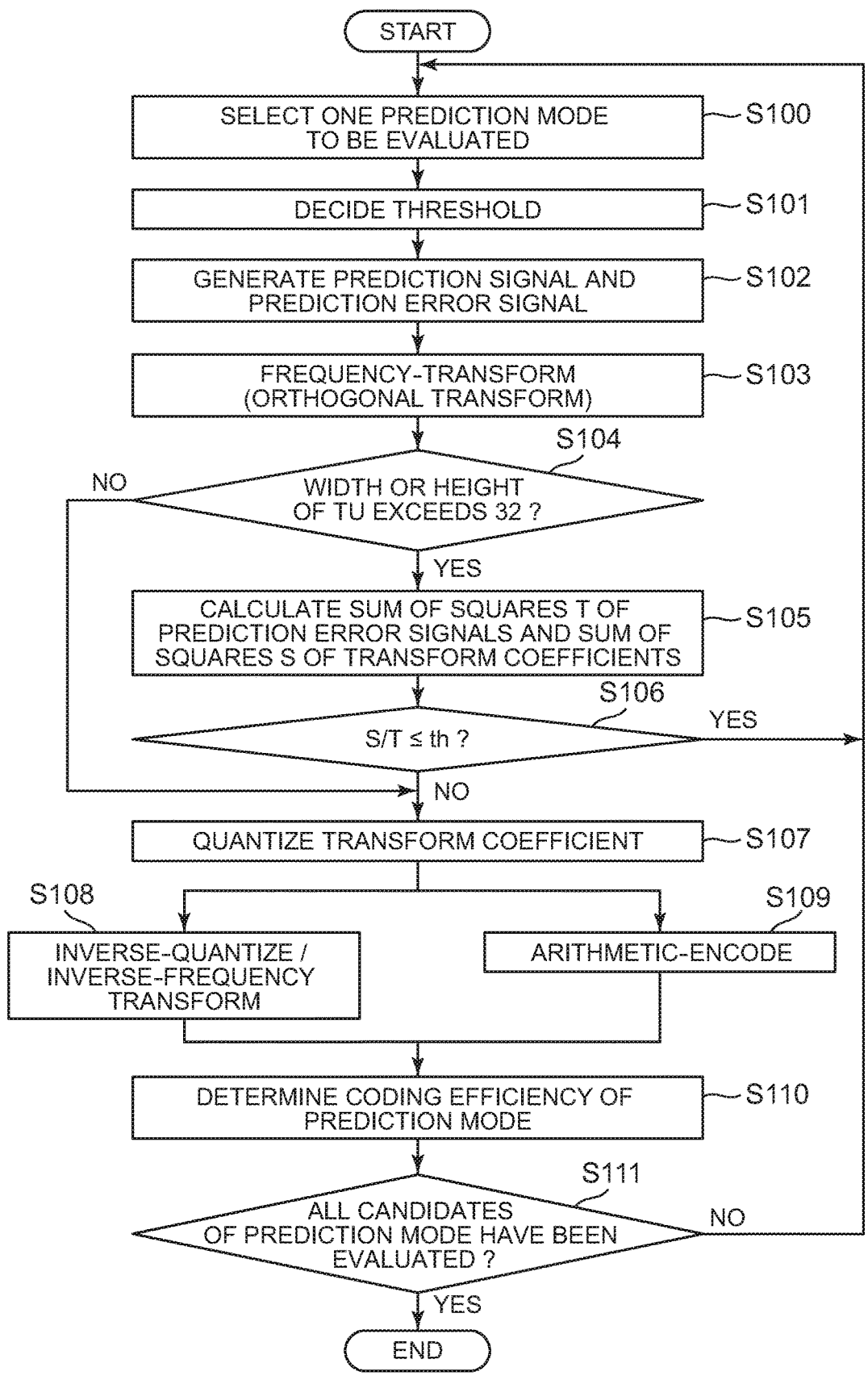
FIG. 4 It depicts a flowchart showing an operation regarding evaluation of candidates of prediction mode in the third example embodiment of the video coding device.

FIG. 4 is a flowchart showing an operation of the video coding device regarding evaluation of candidates of prediction mode in the third example embodiment (Example embodiment 3). The configuration of the video coding device of the third example embodiment is the same as that illustrated in FIG. 1.

In the first and second example embodiments, the threshold value th compared to the value of S/T is a fixed value, however in the third example embodiment, the threshold value th is a variable value.

As an example, the threshold th is set according to one or more of the prediction method (for example, intra/inter prediction, one-directional prediction/bi-directional prediction), the size of the TU, and the prediction mode. Taking inter-prediction as an example, the controller 120 lowers the threshold th corresponding to the prediction mode so that a particular prediction mode is more likely to be selected when coding with respect to a P-slice or a B-slice. Since the degree of information loss in a 64×64 block is larger than in a 64×32 block or a 32×64 block when the high frequency area is eliminated, the controller 120 may set the threshold according to the size of the block, for example.

As shown in FIG. 4, when the prediction mode to be evaluated is selected (S100), the controller 120 sets the threshold according to the size of the TU or the prediction mode (step S101). The controller 120 may set the threshold according to the size of the TU and the prediction mode.

When the threshold is set according to the size of the block, the controller 120 need only perform the process of step S101 once at the beginning of the process shown in FIG. 4, instead of performing it after the process of step S100.

In the third example embodiment, since the threshold th is set according to the prediction method, the TU size, or the prediction mode, the appropriate threshold can be used according to the coding situation.

Another Example Embodiment 1

In VVC, SBT (Sub-block Transform) can be used. SBT is a method that partitions a block horizontally or vertically into two sub-blocks and performs frequency-transforming with respect to only one of the sub-blocks. All prediction error signals in the other subblock are replaced by 0. Since SBT also causes information loss, the above example embodiments may be applied.

Another Example Embodiment 2

In VVC, LFNST (Low-Frequency Non-Separable Transform) can be used. LFNST is a method to re-transform a transform coefficient using an orthogonal transforming matrix defined for LFNST when coding by intra prediction. Up to 48 coefficients are subject to re-transforming. All coefficients other than those subject to re-transforming (976 coefficients in the case of 32×32) are set to 0. Therefore, since exclusion of coefficients is performed for coefficients of high frequency components, information loss will also occur in LFNST, and each of the above example embodiments may be applied.

Although it is possible to configure the video coding device of each of the above example embodiments by individual hardware circuits or integrated circuits, it is also possible to realize them by a computer having a processor such as a CPU (Central Processing Unit) and a memory. For example, a program for implementing the method (processing) in the above example embodiments may be stored in a storage device (storage medium), and each function may be realized by executing the program by a CPU.

Figure 5:
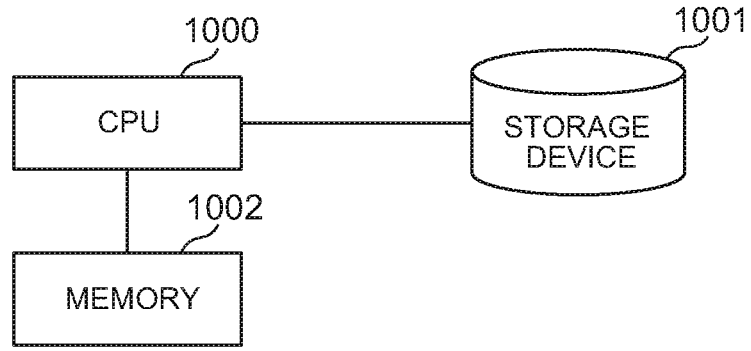
FIG. 5 It depicts a block diagram showing an example of a computer with a CPU.

FIG. 5 shows a block diagram showing an example of a computer with a CPU. The computer is implemented in the video coding device. The CPU 1000 executes processing in accordance with a program stored in a storage device 1001 to realize the functions in the above example embodiments. That is to say, the functions of the block partitioning unit 101, the subtractor 102, the transformer 103, the quantizer 104, the inverse quantizer 105, the inverse transformer 106, the adder 107, the loop filter 108, the predictor 110, the arithmetic encoder 113, the mode determination unit 114, the code string generation 115, the predictor 110 (the intra-predictor 111 and the inter-predictor 112) and the controller 120 including the information loss determination unit 121 in the video coding device shown in FIG. 1 are realized.

The storage device 1001 is, for example, a non-transitory computer readable media. The non-transitory computer readable medium is one of various types of tangible storage media. Specific examples of the non-transitory computer readable media include a magnetic storage medium (for example, hard disk), a CD-ROM (Compact Disc-Read Only Memory), a CD-R (Compact Disc-Recordable), a CD-R/W (Compact Disc-ReWritable), and a semiconductor memory (for example, a mask ROM, a PROM (Programmable ROM), an EPROM (Erasable PROM), a flash ROM).

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 6:
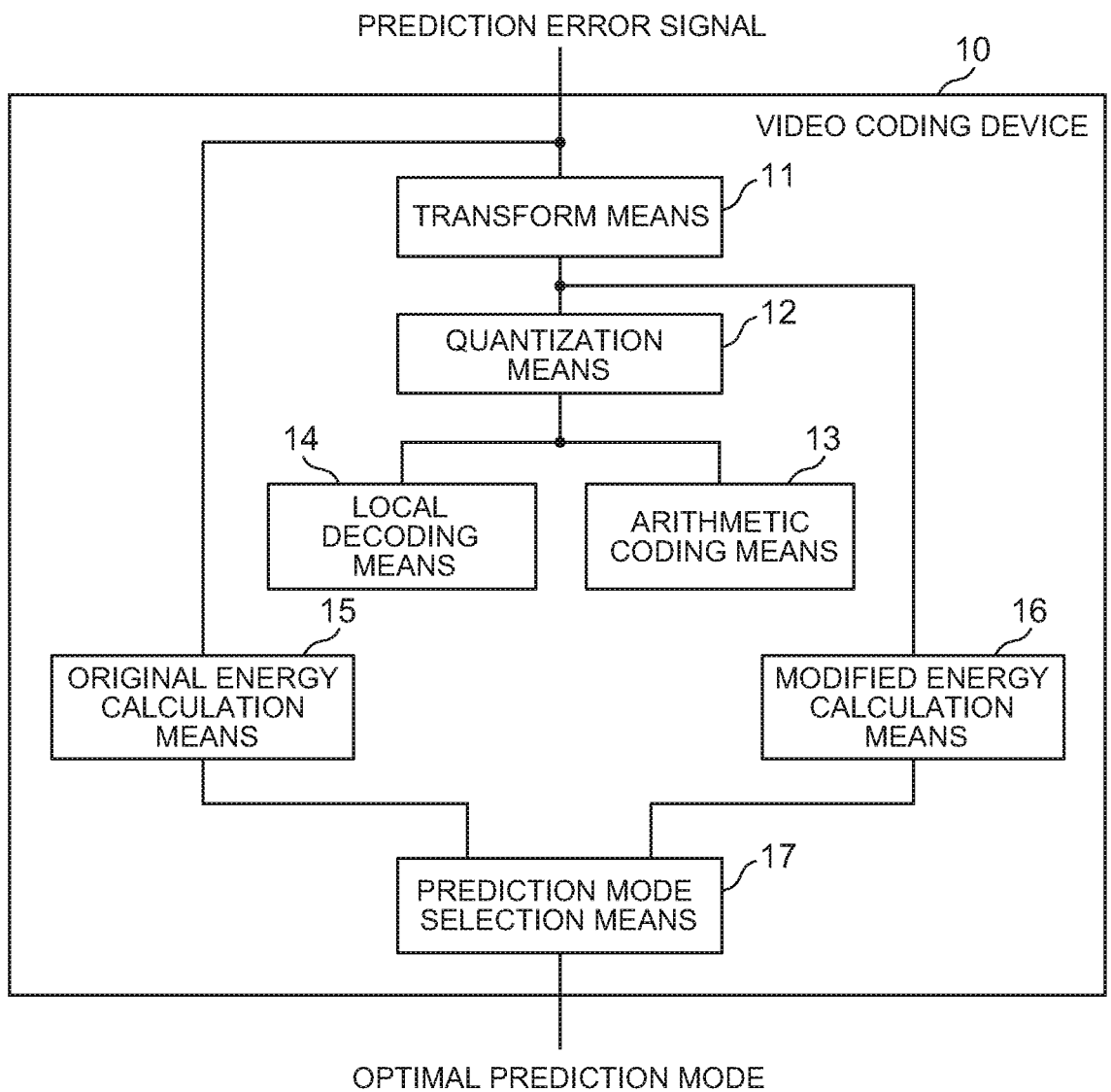
FIG. 6 It depicts a block diagram of the main part of the video coding device.
Figure 7A:
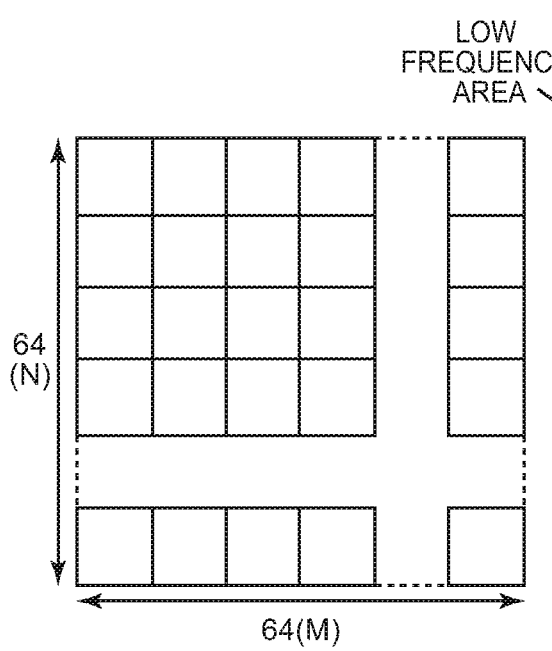
FIG. 7A It depicts an explanatory diagram for explaining DCT.
Figure 7B:
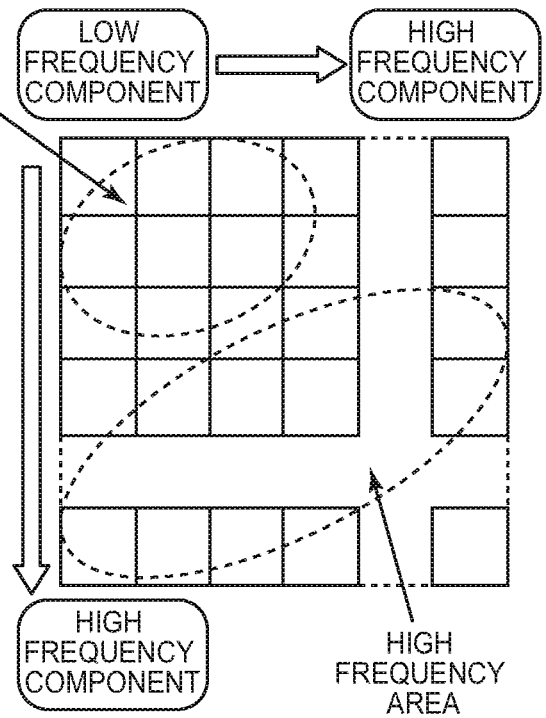
FIG. 7B It depicts an explanatory diagram for explaining DCT.
Figure 7C:
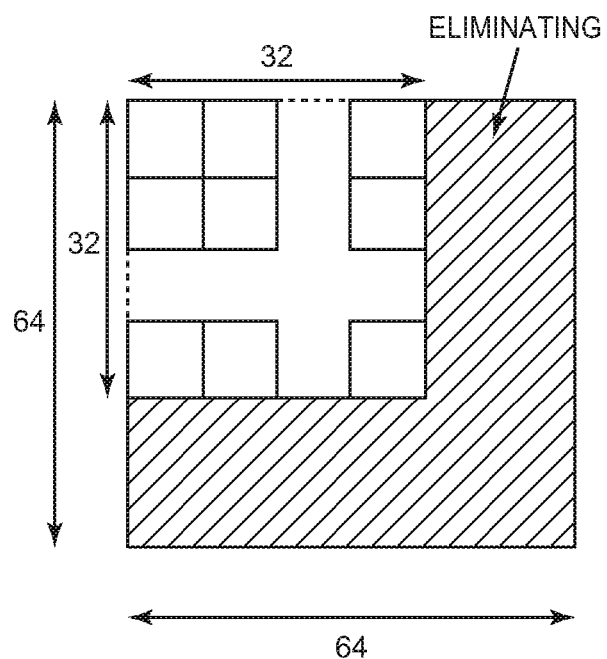
FIG. 7C It depicts an explanatory diagram for explaining DCT.

FIG. 6 is a block diagram showing the main part of a video coding device. The video coding device 10 shown in FIG. 6 comprises transform means 11 (in the example embodiments, realized by the transformer 103) for transforming prediction error signals of a block to be processed (for example, a TU to be processed) to generate transform coefficients, quantization means 12 (in the example embodiments, realized by the quantizer 104) for quantizing the transform coefficient to generate a quantized transform coefficient, arithmetic coding means 13 (in the example embodiments, realized by the arithmetic encoder 113) for arithmetic-coding the quantized transform coefficient, local decoding means 14 (in the example embodiments, realized by the inverse quantizer 105, the inverse transformer 106, and the adder 107) for local-decoding the quantized transform coefficients, prediction mode selection means 17 (in the example embodiments, realized by the information loss determination unit 121 and the mode determination unit 114) for evaluating a plurality of candidates of prediction mode to select an optimal prediction mode for the block to be processed, original energy calculation means 15 (in the example embodiments, realized by the information loss determination unit 121) for calculating a first value (for example, a sum of squares T of the prediction error signals)

representing energy of the prediction error signals of the block to be processed, and modified energy calculation means 16 (in the example embodiments, realized by the information loss determination unit 121) for eliminating specified transform coefficients when at least one of a width and a height of the block to be processed exceeds a predetermined value (for example, 32) and calculating a second value (for example, a sum of squares S of the transform coefficients) representing energy of the transform coefficients other than the eliminated transform coefficients, wherein the prediction mode selection means 17 decides not to make the candidate of prediction mode the optimal prediction mode, without the quantization means 12, the arithmetic coding means 13 and the local decoding means 14 executing quantizing, arithmetic-coding and local decoding, in a case where the second value is smaller than a predetermined degree as compared to the first value (for example, S/T≤th).

The video coding device 10 may comprise threshold setting means (in the example embodiments, realized by the controller 120) for setting the threshold according to one or more of the prediction mode and a size of the block to be processed.

Although the invention of the present application has been described above with reference to example embodiments, the present invention is not limited to the above example embodiments. Various changes can be made to the configuration and details of the present invention that can be understood by those skilled in the art within the scope of the present invention.

This application claims priority based on Japanese Patent Application No. 2021-009539 filed on Jan. 25, 2021, the disclosure of which is incorporated herein in its entirety.

REFERENCE SIGNS LIST

10 Video coding device
11 Transform means
12 Quantization means
13 Arithmetic coding means
14 Local decoding means
15 Original energy calculation means
16 Modified energy calculation means
17 Prediction mode selection means
101 Block partitioning unit
102 Subtractor
103 Transformer
104 Quantizer
105 Inverse quantizer
106 Inverse transformer
107 Adder
108 Loop filter
110 Predictor
111 Intra-predictor
112 Inter-predictor
113 Arithmetic encoder
114 Mode determination unit
115 Code string generator
120 Controller
121 Information loss determination unit
131 Horizontal direction frequency transformer
132 Horizontal direction high frequency component eliminator
133 First right bit shifter
134 Vertical direction frequency transformer
135 Vertical direction high frequency component eliminator
136 Second right bit shifter
1000 CPU
1001 Storage device
1002 Memory

What is claimed is:

1. A video coding device having functions of intra-prediction and inter-prediction, comprising:
a memory storing software instructions, and
one or more processors configured to execute the software instructions to
transform prediction error signals of a block to be processed to generate transform coefficients;
quantize the transform coefficient to generate a quantized transform coefficient;
arithmetic-code the quantized transform coefficient;
local-decode the quantized transform coefficients;
select an optimal prediction mode for the block to be processed from a plurality of available prediction modes after evaluation of these modes;
calculate a first value representing energy of the prediction error signals of the block to be processed; and
eliminate specified transform coefficients when at least one of a width and a height of the block to be processed exceeds a predetermined value and calculate a second value representing energy of the transform coefficients other than the eliminated transform coefficients, wherein
the one or more processors are configured to execute the software instructions to decide not to select the available prediction mode as the optimal prediction mode of the block, without executing quantizing, arithmetic-coding and local decoding, in a case where the second value is smaller than a predetermined degree as compared to the first value.

2. The video coding device according to claim 1, wherein the one or more processors are configured to execute the software instructions to
calculate a sum of squares of the prediction error signals as the first value, and
calculate a sum of squares of the transform coefficients as the second value.

3. The video coding device according to claim 1, wherein the one or more processors are configured to execute the software instructions to
execute discrete cosine transform in a horizontal direction of the block to be processed and discrete cosine transform in a vertical direction of the block to be processed in sequence, and
calculate the second value from the transform coefficients obtained when the previously performed discrete cosine transform is completed.

4. The video coding device according to claim 1, wherein the predetermined value is 32.

5. The video coding device according to claim 1, wherein the one or more processors are configured to execute the software instructions to
determine whether a ratio of the second value to the first value is less than or equal to a threshold.

6. The video coding device according to claim 5, wherein the threshold is a fixed value.

7. The video coding device according to claim 5, wherein the one or more processors are configured to further execute the software instructions to
set the threshold according to one or more of the prediction mode and a size of the block to be processed.

8. The video coding device according to claim 1, wherein the one or more processors are configured to execute the software instructions to
realize a function of local decoding includes inverse-quantizing a transform quantization value to restore the transform coefficient and inverse-frequency-transforming the restored transform coefficient, and
when at least one of the width and height of the block to be processed exceeds the predetermined value, perform inverse-frequency-transforming after setting the specified transform coefficients to 0.

9. A video coding method executing intra-prediction and inter-prediction, comprising:
transforming prediction error signals of a block to be processed to generate transform coefficients;
calculating a first value representing energy of the prediction error signals of the block to be processed;
eliminating specified transform coefficients when at least one of a width and a height of the block to be processed exceeds a predetermined value and calculating a second value representing energy of the transform coefficients other than the eliminated transform coefficients;
quantizing the transform coefficient to generate a quantized transform coefficient;
arithmetic-coding the quantized transform coefficient;
local-decoding the quantized transform coefficients; and
selecting an optimal prediction mode for the block to be processed from a plurality of available prediction modes after evaluation of these modes, wherein
the available prediction mode is not selected as the optimal prediction mode of the block, in a case where the second value is smaller than a predetermined degree as compared to the first value.

10. A non-transitory computer-readable recording medium storing a video coding program which, when executed by a processor, performs:
the video coding program causes a computer executing intra-prediction and inter-prediction, to execute:
a process of transforming prediction error signals of a block to be processed to generate transform coefficients;
a process of calculating a first value representing energy of the prediction error signals of the block to be processed;
a process of eliminating specified transform coefficients when at least one of a width and a height of the block to be processed exceeds a predetermined value and calculating a second value representing energy of the transform coefficients other than the eliminated transform coefficients;
a process of quantizing the transform coefficient to generate a quantized transform coefficient;
a process of arithmetic-coding the quantized transform coefficient;
local-decoding the quantized transform coefficients; and
a process of selecting an optimal prediction mode for the block to be processed from a plurality of available prediction modes after evaluation of these modes, wherein
the available prediction mode is not selected as the optimal prediction mode of the block, without executing quantizing, arithmetic-coding and local decoding, in a case where the second value is smaller than a predetermined degree as compared to the first value.

* * * * *